(12) United States Patent
Oerlemans

(10) Patent No.: US 7,200,759 B2
(45) Date of Patent: Apr. 3, 2007

(54) METHOD AND DEVICE FOR MAKING INFORMATION CONTENTS OF A VOLATILE SEMICONDUCTOR MEMORY IRRETRIEVABLE

(75) Inventor: Robert Vincent Michel Oerlemans, Eindhoven (NL)

(73) Assignee: Safenet B.V. (NL)

( * ) Notice: Subject to any disclaimer, the term of this patent is extended or adjusted under 35 U.S.C. 154(b) by 1023 days.

(21) Appl. No.: 09/875,977

(22) Filed: Jun. 8, 2001

(65) Prior Publication Data

US 2002/0188858 A1     Dec. 12, 2002

(51) Int. Cl.
*G06F 12/14*    (2006.01)
*H03K 19/00*    (2006.01)

(52) U.S. Cl. .................. 713/194; 326/8; 713/189; 713/193

(58) Field of Classification Search ............ 380/44, 380/268; 713/189–194, 151, 501; 365/218; 326/8
See application file for complete search history.

(56) References Cited

U.S. PATENT DOCUMENTS

| | | | | |
|---|---|---|---|---|
| 4,593,384 A | * | 6/1986 | Kleijne | 365/228 |
| 4,634,807 A | * | 1/1987 | Chorley et al. | 705/55 |
| 4,715,034 A | * | 12/1987 | Jacobson | 714/719 |
| 4,720,700 A | * | 1/1988 | Seibold et al. | 340/568.1 |
| 4,773,071 A | * | 9/1988 | Nielsen | 714/719 |
| 4,783,801 A | * | 11/1988 | Kaule | 713/194 |
| 5,237,611 A | * | 8/1993 | Rasmussen et al. | 380/284 |
| 6,212,600 B1 | * | 4/2001 | Friedman et al. | 711/112 |
| 6,385,727 B1 | * | 5/2002 | Cassagnol et al. | 713/193 |
| 2001/0025343 A1 | * | 9/2001 | Chrisop et al. | 713/193 |

OTHER PUBLICATIONS

Gutmann, P., "Secure Deletion of Data from Magnetic and Solid-State Memory," Sixth USENIX Security Symposium Proceedings, Jul. 1996.*
Dallas Semiconductor Corp., "DS5002FP: Secure Microprocessor Chip," User Manual, 1995.*

* cited by examiner

*Primary Examiner*—Gilberto Barrón, Jr.
*Assistant Examiner*—Matthew Heneghan
(74) *Attorney, Agent, or Firm*—Venable, LLP; James R. Burdett; Jeffri A. Kaminski

(57) ABSTRACT

A method is disclosed of making information contents of memory-cells of a volatile semiconductor memory irretrievable. In a first step a digital pattern is generated and in a second step the information contents are overwritten with the digital pattern at least two times. The digital pattern is predefined, comprising both zeros and ones and overwrites the information contents alternately with its complementary pattern.

20 Claims, 1 Drawing Sheet

METHOD AND DEVICE FOR MAKING INFORMATION CONTENTS OF A VOLATILE SEMICONDUCTOR MEMORY IRRETRIEVABLE

FIELD OF THE INVENTION

The invention relates to computers and more particularly to computers having cryptographic chips having a volatile semiconductor memory for storing cryptographic keys.

ART BACKGROUND

Volatile semiconductor memories, such as wellknown random access memories (RAM) are common devices, commonly used in computers and many other digital systems. More and more computers are provided with a cryptographic chip. Such chip may be provided with sensitive information that has to be destroyed upon tampering immediately. In most cases the information that has to be destroyed comprises keys that may be used to decode coded messages. To realize a high system-safety such keys are commonly stored in a volatile semiconductor memory part of a cryptographic chip. In many cases such a key is also generated in the cryptographic chip itself. Since the key does not have to leave the cryptographic chip it is virtually impossible for a hacker to obtain control of the key via a software attack. A hacker in principle can only reach the hard disc of a host computer and not embedded volatile semiconductor memory of a cryptographic chip present in a computer. However a physical attack on the chip is still possible. By opening the chip and probing the volatile semiconductor memory it could be possible to read out information from that memory. An example may be using electron microscopy to determine charge present in memory-cells of the volatile semiconductor memory and thereby the digital information contents of that memory.

U.S. Pat. No. 5,502,670 describes a method to flush all memory-cells of a volatile semiconductor memory with information of the same value, either all zeros or all ones. Nevertheless it has been determined that remnant charge after such an operation may still be sufficient to determine previous charge in each of the memory-cells, for example by the abovementioned electron microscopy, thereby corrupting security. It has also been determined that interrupting power supply to the volatile semiconductor memory and have stored charges flow away is an insufficient measure. It takes too long and even after old charges have flowed away it is still possible by, for example, electron microscopic probing to determine remnant charges in each of the memory-cells and thereby determine the original information contents of the memory.

The present invention overcomes the abovementioned limitations and provides method and device for making previous information contents of memory-cells of volatile semiconductor memory irretrievable.

SUMMARY OF THE INVENTION

The present invention provides methods and apparatus for making previous information contents of memory-cells of a volatile semiconductor memory irretrievable. In a first step a digital pattern is generated. In a second step information contents of memory-cells of a volatile semiconductor memory are overwritten with the digital pattern at least two times. The digital pattern may be a predefined digital pattern comprising both zeros and ones that overrides that information contents alternately with its complementary pattern.

DETAILED DESCRIPTION OF THE INVENTION

Figure 1:
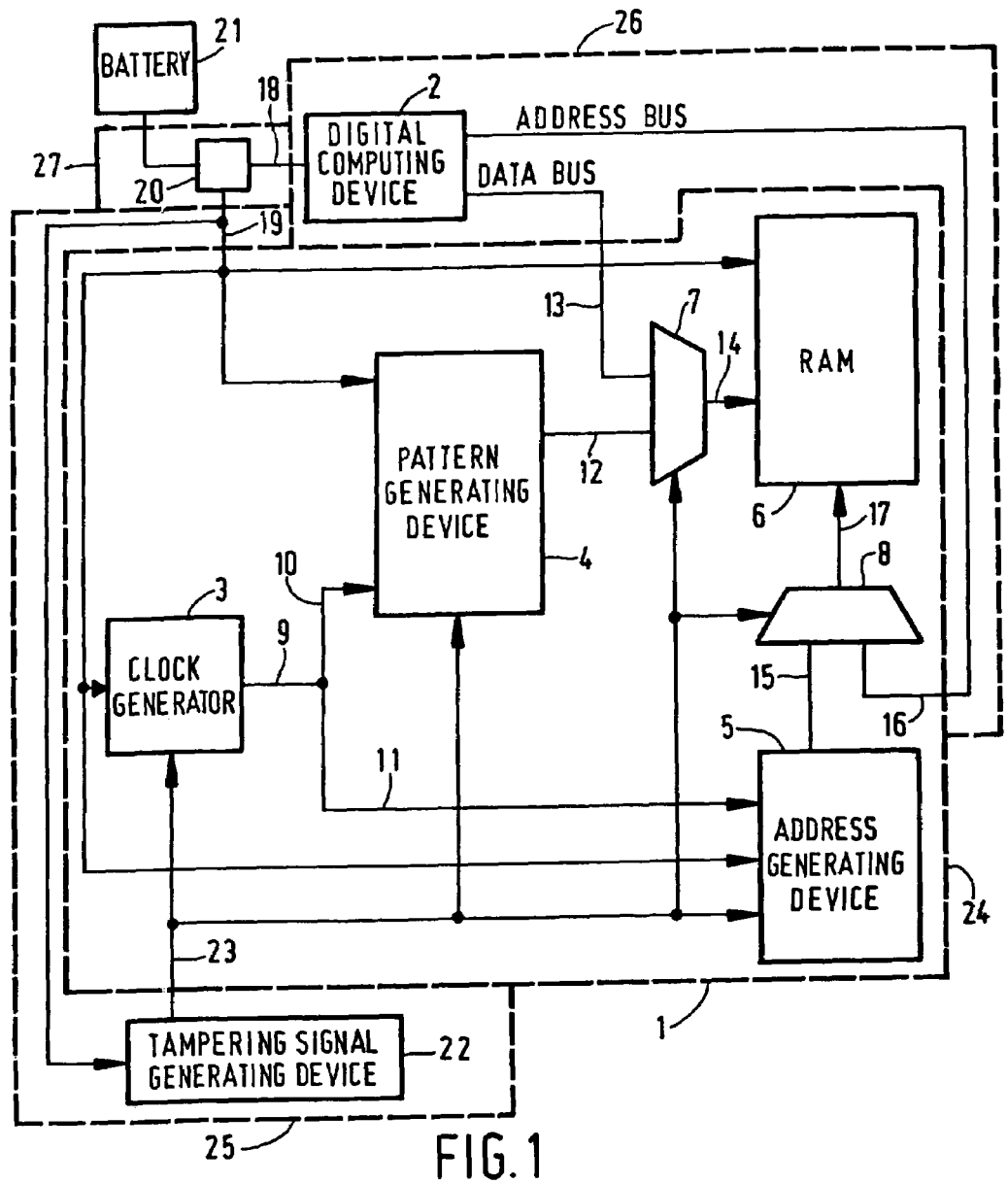
FIG. 1 shows a cryptographic chip cooperating with a digital computing device.

FIG. 1 shows enclosed by dashed line 24 a cryptographic chip 1 cooperating with a digital computing device 2. The cryptographic chip 1 comprises a clock generator 3, a pattern generating device 4, an address generating device 5, a volatile semiconductor memory (hereinafter RAM) 6 and switches 7 and 8. Clock generator 3 is connected via lines 9 and 10 to pattern generating device 4, and via lines 9 and 11 to address generating device 5. Pattern generating device 4 has a data-output connected to a line 12 that is connected to a first input of switch 7. A second input of switch 7 is connected to a data bus 13 of digital computing device 2. An output of switch 7 is connected to a data input of RAM 6 through a line 14.

An address output of an address generating device 5 is connected through a line 15 to a first input of switch 8. A second input of switch 8 is connected through a line 16 to an address bus of digital computing device 2. An output of switch 8 is connected through a line 17 to an address input of RAM 6.

The digital computing device 2 comprises means for providing the digital computing device 2 and cryptographic chip 1 with main power. Such main power is provided to cryptographic chip 1 through line 18. Line 18 is connected to a power supply line 19 through an automatic switch 20. Automatic switch 20 connects powerline 19 either to line 18 or to a backup battery 21. Through power supply line 19 power, either main power from digital computing device 2 or backup power from battery 21, is supplied to clock generator 3, pattern generating device 4, address generating device 5 and RAM 6. Such power is also provided via line 19 to a tampering signal generating device 22. An output of tampering signal generating device 22 is connected via line 23 to clock generating 3, pattern generating device 4, address generating device 5 and switches 7 and 8.

When in operation the digital computing device 2 and the cryptographic chip 1 operate to place a cryptographic key in RAM 6. Such cryptographic key may be supplied from a third device (not shown), the digital computing device 2 or may be generated in a device (not shown) on cryptographic chip 1.

Tampering signal generating device 22 generates a tampering signal on line 23 once tampering is being detected by the tampering signal generating device 22. Tampering may take many forms, such as physically trying to remove the cryptographic chip from the digital computing device 2, physically removing (part of) the housing of the cryptographic chip 1, etc.

Operation of the security measures taken in response to a tamper are independent of the power status of the digital computing device 2. In case the digital computing device 2 is powered up, main power is supplied through line 18. In case the digital computing device 2 is powered down power is supplied through line 19 from battery 21 through switch 20. As a consequence tampering signal generating device 22 and cryptographic chip 1 are being powered all the time and the tampering protection provided by the circuit shown in FIG. 1 is operative all the time, independently of digital computing device 2 being in a power up state or in a power down state.

As long as no tampering takes place and digital computing device 2 is powered up no tampering signal is present on line 23 and switches 7 and 8 connect the data bus and the address bus, respectively of digital computing device 2 through lines 14 and 17 to RAM 6. Thereby digital computing device 2 has access to RAM 6 in the same way cryptographic chip 1 cooperates with digital computing device 2 in a way not further shown through lines 13 and 16.

If a tamper occurs any cryptographic key in RAM 6 has to be made irretrievable. It has been found that disconnecting RAM 6 from power through line 19 is insufficient to remove all charges from the memory-cells of RAM 6. Information contents that were present in the memory-cells at power cut off are still retrievable.

It has been proposed in U.S. Pat. No. 5,502,670 to override the information contents of all memory-cells of RAM 6 with one value, either zero or one. It has been found that such a measure is insufficient to provide sufficient security to tampering. First, such writing of all zeros or all ones in all memory-cells of RAM 6 through the regular data bus and address bus of digital computing device 2 takes more time than acceptable from a security point of view. From a security point of view previous information contents of memory-cells of RAM 6 should become irretrievable within one millisecond. Secondly, writing all zeros or all ones in RAM 6 still leaves sufficient traces of previous information contents in individual memory-cells to make it possible to retrieve such previous information contents.

Figure 2:
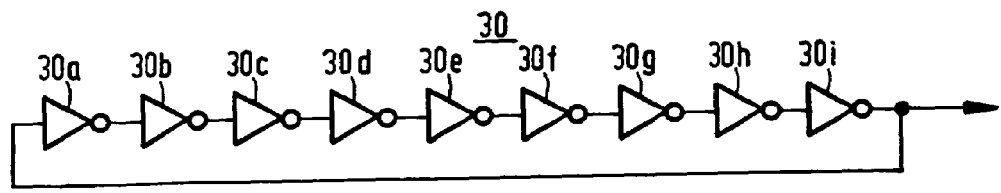
FIG. 2 shows a clock generator.

Now it is assumed that tampering signal generating device 22 generates a tampering signal on line 23. In response to a tampering signal on line 23 clock generator 3 supplies a clock signal at lines 9, 10 and 11. An example of such a clock generator 3 is shown at 30 in FIG. 2. Clock generator 30 comprises inverters 30a, . . . , 30i, that are series connected in circular fashion, free running and power continuously. Upon the tampering signal on line 23 the free running clock is deglitched. Pattern generating device 4 and address generating device 5 in response to the tampering signal on line 23 have started generating a particular digital pattern and addresses of memory-cells in RAM 6,respectively. In response to the tampering signal on line 23 switches 7 and 8 have switched from connecting line 13 to line 14 and line 16 to line 17, respectively to the situation that line 12 is connected to line 14 and line 15 is connected to line 17, respectively. Thereby the pattern generated by the pattern generating device 4 at line 12 and through switch 7 present at data input of RAM 6 on line 14 will be written in the memory-cells addressed by an address generated by the address generating device 5 and via line 15, switch 8 and line 17 present at an address input of RAM 6. Clock generator 3 has a high frequency. Typically, address generation through line 16 is dependent on a system clock of digital computer device 2. The address generating rate on line 16, however, is determined by various well-known factors that tend to lower the address generating rate on line 16. As a result all memory-cells of RAM 6 will be addressed by addresses from address generating device 5 at a rate that in practice is substantially greater than is possible through addressing via line 16. Moreover through line 19 and switch 20 it is guaranteed that clock generator 3, pattern generating device 4 and address generating device 5 and RAM 6 are always supplied with power whereas the availability of address signals at line 16 is dependent upon the power up or power down state of digital computing device 2.

Preferably the clock frequency of clock generator 3 is such that address generator device 5 addresses all memory-cells of RAM 6 at least three times within one millisecond. Thereby it is achieved that the pattern, generated by pattern generating device 4, overwrites previous information contents of each memory-cell of RAM 6 at least three times within one millisecond. It has been found that overwriting each memory-cell of RAM 6 at least two times is sufficient to make previous information contents of each cell virtually irretrievable. Nevertheless the more times the digital pattern is written in the memory-cells of RAM 6 the less probable it is that previous information contents of memory-cells of RAM 6 may be retrieved. Therefore, in practice, after a tamper was detected by tampering signal generating device 22 the above described process of generating addresses in device 5 and patterns in devices 4 will continue, typically until battery 21 has run out of power.

A prefered embodiment of pattern generating device 4 generates a predefined digital pattern comprising both zeros and ones. In a first pass of all memory-cells of RAM 6 the predefined digital pattern is written to RAM 6 and thereby overwrites information contents of the memory-cells of RAM 6 and in a second pass a complementary pattern of the predefined digital pattern is written to RAM 6. Thereby each memory-cell on each pass is alternatingly provided with a zero and one. Thereby less passes are needed to make previous information contents of memory-cells of RAM 6 completely irretrievable.

The predefined digital pattern comprising both zeros and ones has a specific ratio of the number of zeros and the number of ones. That ratio preferably differs less than 30 percent from one and more preferably is one. The closer the ratio is to one the less time it takes that one may be certain that both a zero and a one have been written to a certain memory-cell of RAM 6.

As an alternative pattern generating device 4 may generate a random pattern. At the present state of the art random pattern generators take more time to stabilize at a true random pattern than generators for a predefined digital pattern. Nevertheless at high clock rates also random pattern generators may be sufficiently fast to be useable as pattern generating device 4 in cryptographic chip 1.

At present a pattern generating device 4 generating a predefined digital pattern comprising both zeros and ones is preferred because of testability of cryptographic chip 1. Cryptographic chip 1 is to be used in an environment in which security plays a large role. As a consequence testing of cryptographic chip 1 is important, also testing of the circuit shown in FIG. 1. Testing of the circuit shown in FIG. 1 means that RAM 6 is provided with a predefined cryptographic key in the memory-cells of RAM 6. Then a signal must be provided on line 23 simulating a tampering signal. Thereafter clock generator 3, pattern generating device 4, address generating device 5, RAM 6 and switches 7 and 8 operate to make the key irretrievable from RAM 6. In order to be certain that a certain content of a certain memory-cell of RAM 6 does has not have any trace of the key in it one must be certain of what to expect in that certain memory-cell. The use of a predefined digital pattern generated by pattern generating device 4, allows to know beforehand what signal, zero or one, is to be expected in a certain memory-cell of RAM 6 during testing. Thereby during testing it is possible to determine the degree to which the previous information contents of memory-cells of RAM 6, in particular a predefined key, is or is not anymore retrievable from RAM 6.

As indicated by dashed lines 25, 26 and 27 and without leaving the spirit and scope of the present invention the single chip may comprise both cryptographic chip 1 and digital computing device 2 and/or tampering signal generating device 22 and/or switch 20.

While the invention has been described in conjunction with a preferred embodiment, it is evident that numerous alternatives, modifications, variations and uses will be apparent to those skilled in the art in light of the foregoing description. All such alternatives, modifications, variations and uses are considered to embody the invention disclosed herein, above and claimed in the appended claims.

The invention claimed is:

1. A method of making information contents of memory cells of a volatile semiconductor memory irretrievable, said method comprising:
  generating a digital pattern;
  writing the information contents in the memory cells at a first rate during normal processing before tampering is detected; and
  overwriting the information contents in the memory cells with a pattern based upon the digital pattern at least two times at a second rate greater than the first rate after detecting tampering.

2. A method according to claim 1, in which said pattern overwrites said information contents alternately with its complementary pattern.

3. A method according to claim 1, in which said pattern is a predefined digital pattern comprising both zeros and ones.

4. A method according to claim 3, in which a ratio of the number of zeros and the number of ones in said predefined digital pattern is about one.

5. A method according to claim 4, in which said ratio differs less than thirty percent from one.

6. A method according to claim 4, in which said ratio is one.

7. A method according to claim 1, in which said digital pattern is a random pattern.

8. A method according to claim 1, further comprising:
  generating the first rate using a processor; and
  generating the second rate using an oscillator separate from the processor.

9. A device comprising a cryptographic chip and a tampering signal generating device for generating a tampering signal upon detection of tampering with the chip, said cryptographic chip comprising a volatile semiconductor memory having a plurality of memory cells, a control device for placing a cryptographic key in memory cells of said volatile semiconductor memory, a pattern generating device for generating a digital pattern, an address generating device for generating addresses of said memory cells, said pattern generating device and said address generating device being connectable to said volatile semiconductor memory, said tampering signal generating device being connected to said pattern generating device and said address generating device, said pattern generating device and said address generating device being adapted for being connected to said volatile semiconductor memory and overwriting contents in said memory cells with a pattern based upon said digital pattern for at least two times in response to said tampering signal, in which said cryptographic chip comprises first connecting means connecting an output of said pattern generating device to a data input of said volatile semiconductor memory, second connecting means for connecting said address generating device to an address input of said volatile semiconductor memory and a clock generator for generating clock signals for said pattern generating device and said address generating device, and comprising a digital processor adapted to successively address addresses of said memory cells at a first rate during normal operation before tampering is detected, said clock generating device and said address generating device being adapted when operating together to successively address addresses of said memory cells at a second rate greater than said first rate in response to said tampering signal.

10. A device according to claim 9, in which said digital pattern is a predefined digital pattern comprising both zeros and ones.

11. A device according to claim 9, in which said digital pattern alternately is said digital pattern and a complementary pattern of said digital pattern.

12. A device according to claim 9, said device being adapted to have a power down state in which no main power is supplied to said device, said device comprising a battery back up power supply, said pattern generating device, said clock generator and said address generating device being permanently connected to said back up battery power supply.

13. A device according to claim 9, in which said second rate is substantially greater than said first rate.

14. A device according to claim 9, in which said second rate is such that all addresses of said memory cells may be addressed at least three times within 1 millisecond.

15. A device comprising a cryptographic chip and a tampering signal generating device for generating a tampering signal in response to tampering with the chip, said cryptographic chip comprising a volatile semiconductor memory having a plurality of memory cells, a control device for placing a cryptographic key in memory cells of said volatile semiconductor memory, a pattern generating device for generating a digital pattern, an address generating device for generating addresses of said memory cells, said pattern generating device and said address generating device being connectable to said volatile semiconductor memory, said tampering signal generating device being connected to said pattern generating device and said address generating device, a processor adapted to write contents in said memory cells at a first rate during normal processing, said pattern generating device and said address generating device being adapted for connection to said volatile semiconductor memory and for overwriting contents in said memory cells with pattern based on said digital pattern for at least two times at a second rate greater than the first rate in response to said tampering signal.

16. A device according to claim 15, in which said digital pattern is a predefined digital pattern comprising both zeros and ones.

17. A device according to claim 15, in which said digital pattern alternately is said digital pattern and a complementary pattern of said digital pattern.

18. A device according to claim 15, said device being adapted to have a power down state in which no main power is supplied to said device, said device comprising a battery back up power supply, said pattern generating device, said clock generator and said address generating device being permanently connected to said back up battery power supply.

19. A device according to claim 15, in which said second rate is substantially greater than said first rate.

20. A device according to claim 15, in which said second rate is such that all addresses of said memory cells may be addressed at least three times within 1 millisecond.

* * * * *